United States Patent
Motohashi et al.

(10) Patent No.: US 8,672,269 B2
(45) Date of Patent: Mar. 18, 2014

(54) VENT STRINGER AND AIRCRAFT MAIN WING

(75) Inventors: Hideto Motohashi, Nagoya (JP);
Yoshifumi Hosokawa, Nagoya (JP);
Toshinari Fujii, Nagoya (JP); Toshiyasu Fukuoka, Nagoya (JP)

(73) Assignee: Mitsubishi Aircraft Corporation, Nagoya-Shi (JP)

( * ) Notice: Subject to any disclaimer, the term of this patent is extended or adjusted under 35 U.S.C. 154(b) by 63 days.

(21) Appl. No.: 13/353,703

(22) Filed: Jan. 19, 2012

(65) Prior Publication Data

US 2012/0187246 A1 Jul. 26, 2012

(30) Foreign Application Priority Data

Jan. 21, 2011 (JP) ................. 2011-010512
Sep. 12, 2011 (JP) ................. 2011-198607

(51) Int. Cl.
*B64C 3/18* (2006.01)
(52) U.S. Cl.
USPC .................... 244/123.1; 244/123.3
(58) Field of Classification Search
USPC ............. 244/119, 120, 123.1, 123.12, 123.3
See application file for complete search history.

(56) References Cited

U.S. PATENT DOCUMENTS

| | | | |
|---|---|---|---|
| 1,710,350 A | 4/1929 | Dewoitine | |
| 1,880,480 A | 10/1932 | Ragsdale | |
| 3,195,841 A | 7/1965 | Krohn | |
| 5,114,100 A | 5/1992 | Rudolph et al. | |
| 5,262,220 A * | 11/1993 | Spriggs et al. | 428/156 |
| 5,944,286 A | 8/1999 | Morris et al. | |
| 7,093,470 B2 | 8/2006 | El-Soudani | |
| 2008/0128553 A1* | 6/2008 | Brown et al. | 244/124 |
| 2008/0283163 A1 | 11/2008 | Bray et al. | |

FOREIGN PATENT DOCUMENTS

| | | |
|---|---|---|
| GB | 540652 A | 10/1941 |
| GB | 876438 | 8/1961 |
| JP | 04-110299 A | 4/1995 |
| JP | 2001-47260 A | 2/2001 |
| JP | 2003-220428 A | 8/2003 |
| JP | 2010-527408 A | 8/2010 |

OTHER PUBLICATIONS

Niu, Michael C.Y., Airframe Structural Design; Conmilit Press Ltd.; 1988; p. 259, Fig. 8.3.7(c).

(Continued)

*Primary Examiner* — Tien Dinh
*Assistant Examiner* — Nicholas McFall
(74) *Attorney, Agent, or Firm* — Pearne & Gordon LLP (57) ABSTRACT

A vent stringer 20 is formed by a pair of ribs 21 rising in the direction perpendicular to an inner surface 11a of a wing panel 11, and a cover 22 provided in the tip end portions of the ribs 21. With rivets 23 unexposed to an outer surface 11b of the wing panel 11, a spark is prevented from occurring in a fuel tank 30, which is provided in a main wing 10, through the rivet 23 at the time of a lightning strike. Formed by being machined integrally with the wing panel 11, the rib 21 is formed with high accuracy so as to match the curved shape of the wing panel 11. The cover 22 has only to be formed by curving a strap member so as to match the shapes of the wing panel 11 and the ribs 21.

13 Claims, 7 Drawing Sheets

(56) References Cited

OTHER PUBLICATIONS

European Search Report for application 12150746.1-2422 dated Jun. 4, 2012.
Michael C.Y Niu "Airframe Structural Design" Jan. 1, 1988, pp. 247-302, XP009158193.
Japanese Office action for application 2011-198607 dated Jun. 25, 2012.
Canadian Office action for Application No. 2,762,748; received Apr. 17, 2013.
Notice of Allowance for JP2011-198607 dated Oct. 10, 2012.

* cited by examiner

VENT STRINGER AND AIRCRAFT MAIN WING

BACKGROUND OF THE INVENTION

1. Field of the Invention

The present invention relates to a vent stringer provided in an aircraft main wing and the aircraft main wing.

2. Description of the Related Art

A fuel tank is provided in an aircraft main wing. Also, in the main wing, a vent member for introducing air from the outside into the fuel tank is provided to prevent the pressure in the tank from becoming negative when the amount of fuel in the fuel tank is decreased. The vent member also has a function of preventing the interior of the tank from becoming overpressurized at the time of refueling on the ground. The vent member has an air introducing duct on the outside of the main wing, and supplies air, which is taken in through this air introducing duct, into the fuel tank.

The vent member is provided so as to be continuous along the spanwise direction of the main wing on the inner peripheral surface side of a wing panel forming the outer surface of the main wing (for example, refer to Michael C. Y. Niu, *Airframe Structural Design*, Conmilit Press Ltd., 1988, p.259, FIG. 8.3.7(c)). Such a vent member includes a vent tube comprised of a tubular pipe attached to the inner peripheral surface of the main wing panel, and a vent stringer utilizing the inner peripheral surface of the main wing panel as a part of a passage wall.

Figure 7:
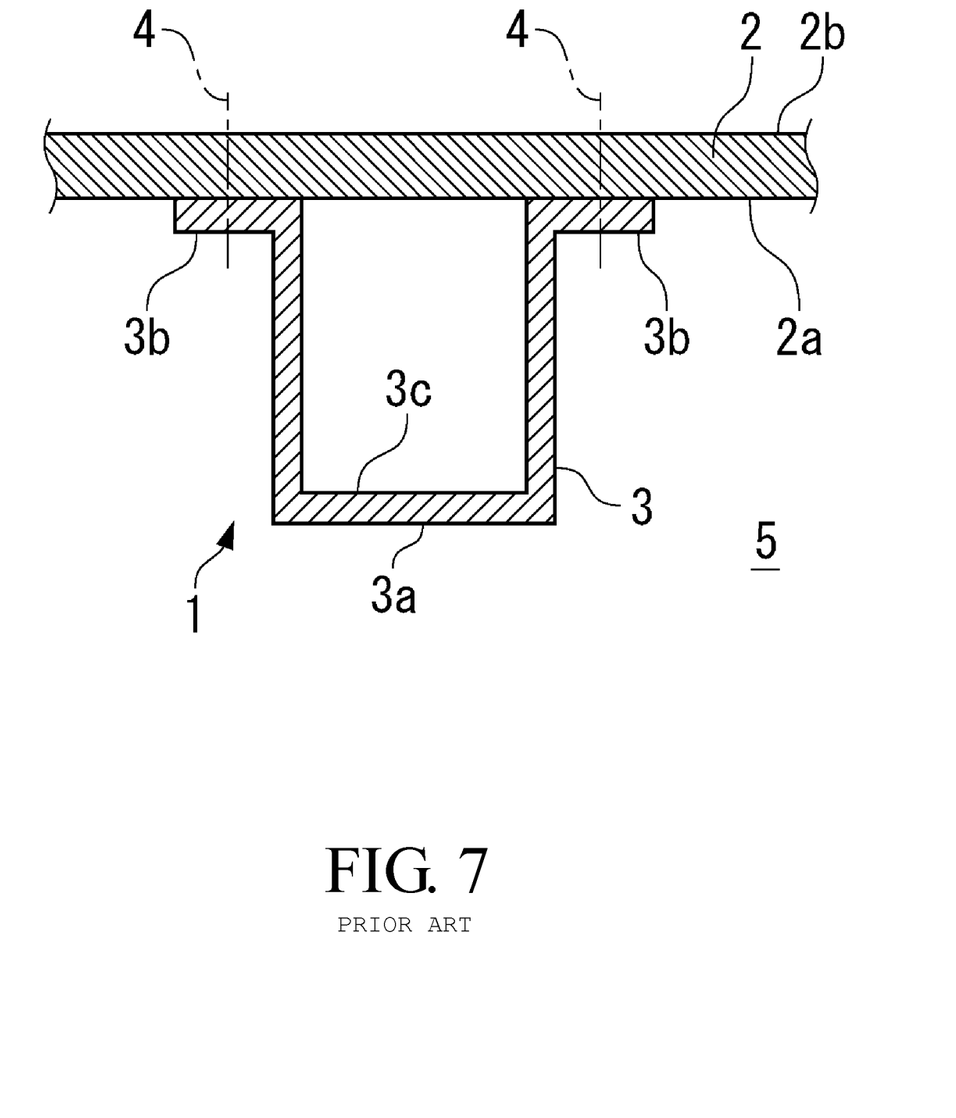
FIG. 7 is a sectional view of a conventional vent stringer.

As shown in FIG. 7, a vent stringer 1 is formed by attaching a channel-shaped stringer member 3 to an inner peripheral surface 2a of a wing panel 2. The stringer member 3 has a body part 3a having a hat-shaped cross section, and flange parts 3b extending to the side at an opening end side of the body part 3a. The flange parts 3b are abutted against the inner peripheral surface 2a of the wing panel 2, and are fastened to the inner peripheral surface 2a of the wing panel 2 with rivets 4 or the like fastening members. By doing this, the stringer member 3 is fixed to the inner peripheral surface 2a of the wing panel 2, whereby a passage of air introduced from the outside of the main wing into a fuel tank 5 is formed by an inner peripheral surface 3c of the body part 3a of the stringer member 3 and the inner peripheral surface 2a of the wing panel 2.

Unfortunately, the above-described configuration has a problem in terms of lightning protection. That is, the rivet 4 or the like fastening member that penetrates both the flange part 3b and the wing panel 2 is used to fix the stringer member 3 to the inner peripheral surface 2a of the wing panel 2. One end of this rivet 4 is exposed to an outer peripheral surface 2b of the wing panel 2, and the other end thereof is exposed to the interior of the fuel tank 5.

Therefore, in case of a lightning strike, an arc discharge (spark) may occur in the fuel tank 5 in the main wing through the rivet 4 or the like fastening member. Therefore, it is necessary to reliably suppress the occurrence of arc discharge in the fuel tank 5 at the time of a lightning strike.

Also, the fastening work using the rivets 4 must be performed on the inner peripheral surface 2a side and the outer peripheral surface 2b side of the wing panel 2, for example, in such a manner that a rivet material is inserted from the outer peripheral surface 2b side of the wing panel 2, and the bucking is performed on the inner peripheral surface 2a side thereof, which poses a problem that much time and labor is required.

Further, the wing panel 2 and the stringer member 3 must be formed curvedly so as to match the shape of main wing. In order to curvedly form these elements, various methods including the peen forming method have been used. In any of these methods, the wing panel 2 and the stringer member 3 must be accurately formed into a predetermined shape. However, in particular, the stringer member 3 has a hat-shaped cross section, so that the rigidity thereof is high and spring back occurs due to residual stress, and therefore it is very difficult to form the wing panel 2 and the stringer member 3 so that these elements abut on each other evenly throughout the entire contact area.

SUMMARY OF THE INVENTION

The present invention has been devised to solve the above-described technical problems, and accordingly an object thereof is to provide a vent stringer which has improved lightning protection capability and by which a wing can be manufactured efficiently and accurately, and an aircraft main wing provided with the vent stringer.

To achieve the above object, the present invention provides a vent stringer including a pair of ribs that are formed integrally on an inner surface of a wing panel forming an outer surface of a wing, the inner surface facing an inside of the wing, and that are continuous in a spanwise direction of the wing; and a cover provided so as to cover a portion between tip end portions of the pair of ribs.

The rib and the cover may be fastened to each other in any way. For example, the cover can be abutted against a flange part formed in the tip end portion of the rib, and can be fastened integrally to the flange part by using fastening members.

With this configuration, the cover can be fastened to the rib on the wing inside of the wing panel.

The rib is preferably formed by being machined from a metallic base material that constitutes the wing panel.

From the viewpoint of workability and ease of handling when work is performed to mount the cover to the rib, the cover is sometimes formed by a plurality of cover members that divide the cover in the spanwise direction of the wing.

In this case, the configuration can be made such that the cover is formed by arranging the plurality of the cover members in the spanwise direction of the wing and by joining the cover members to each other, flanges rising toward the outside of the vent stringer are provided in the end portions of the cover members adjacent to each other in the spanwise direction of the wing, and the flanges of the cover members adjacent to each other are joined to each other by using a joint pin having an axis line in the spanwise direction of the wing.

Also, the present invention provides an aircraft main wing including a wing panel forming an outer surface of the wing, and the vent stringer described above.

According to the present invention, the rib and the cover can be fastened to each other on the wing inside of the wing panel. Thereby, since the fastening members such as rivets are not exposed to the outer surface of the wing, a spark can be prevented from occurring in a fuel tank in the wing through the fastening member at the time of a lightning strike. Since the mating surface of the rib and the cover is also separate from the outer surface of the wing to the inside of wing, a spark is less liable to occur even in the case where the rib and the cover are formed of independent parts. Thus, lightning protection capability can be improved significantly.

Also, since the work for fastening the cover to the rib using the fastening members can be performed on the inner surface side of the wing panel, the workability is excellent.

Further, the ribs are formed by being machined integrally with the wing panel, so that the ribs can be formed with high accuracy so as to match the curved shape of the wing panel.

On the other hand, the cover has only to be formed by curving a strap member so as to match the shapes of the wing panel and the ribs, so that the cover can be caused to abut surely on the tip end portions of the ribs. In particular, in the case where the cover is made of a thin sheet, since the cover is easily deformed following the tip end shape of the rib by the fastening using the fastening members, the workability is excellent.

DETAILED DESCRIPTION OF THE PREFERRED EMBODIMENTS

The present invention will now be described in detail based on an embodiment shown in the accompanying drawings.

Figure 1:
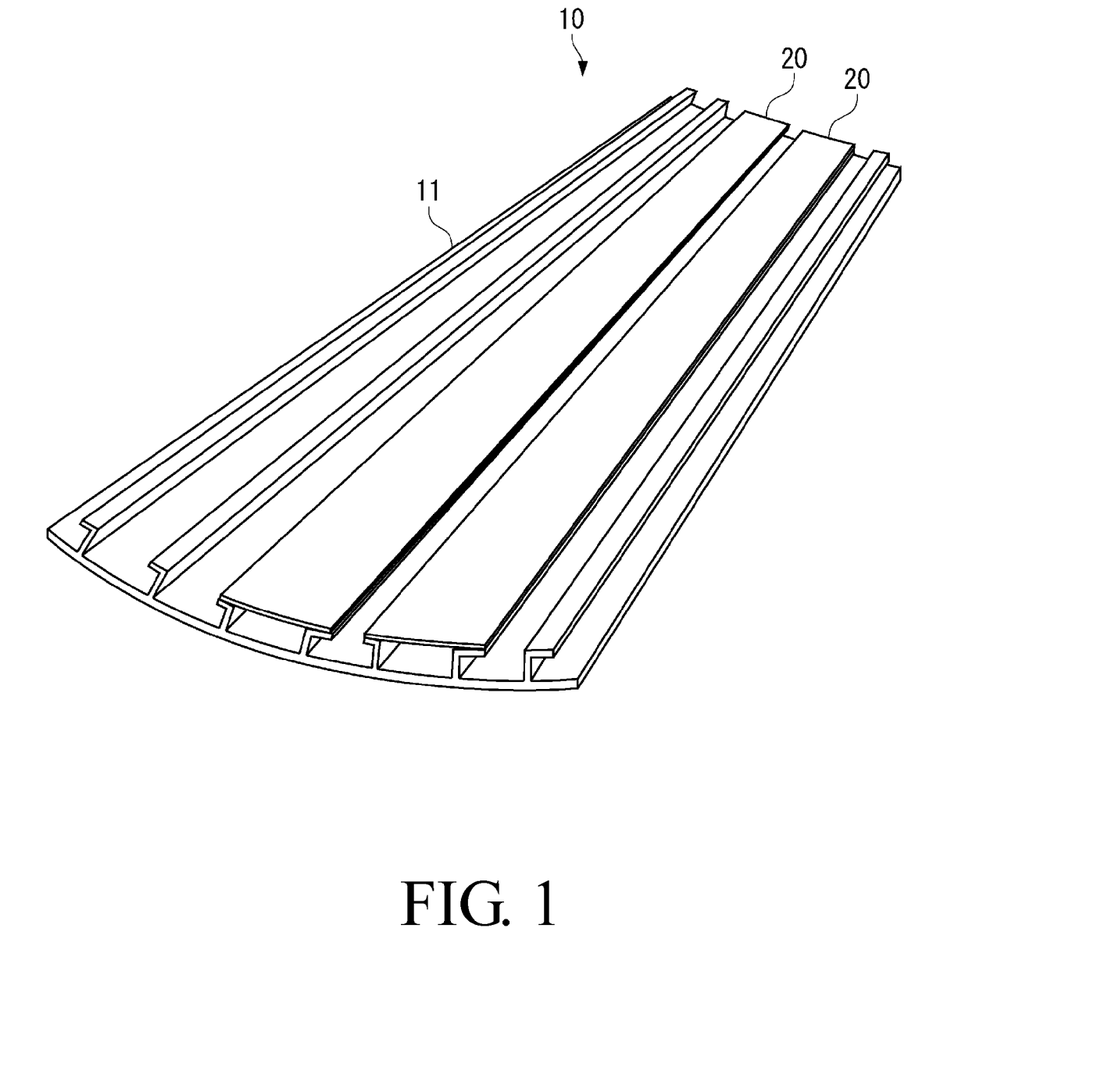
FIG. 1 is a perspective view of a wing panel constituting an aircraft main wing in accordance with an embodiment.

FIG. 1 is a perspective view of a wing panel 11 constituting an aircraft main wing 10 in accordance with the embodiment.

As shown in FIG. 1, the main wing 10 includes the wing panel 11 forming the wing surface on the upper surface side of the main wing 10, and vent stringers 20 provided in the main wing 10.

In this embodiment, the main wing 10 is configured so that the upper surface side thereof is formed by one wing panel 11. However, the configuration is not limited to this one, and two or more wing panels 11 may be combined to form the upper surface side of the main wing 10.

The vent stringers 20 are provided so as to be continuous along the spanwise direction of the main wing 10 and to be parallel with each other.

Figure 2:
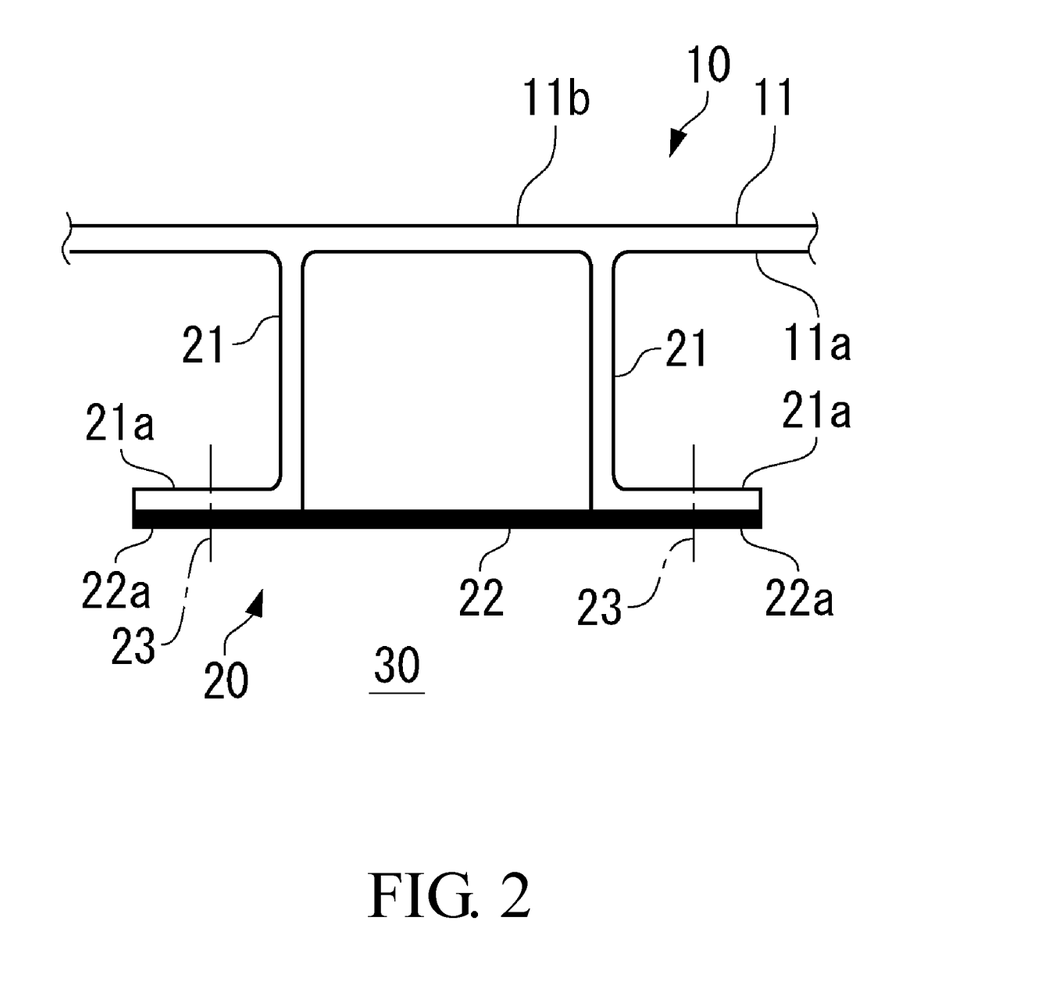
FIG. 2 is a sectional view of a vent stringer.

As shown in FIG. 2, each of the vent stringers 20 is formed by a pair of ribs 21 rising toward the direction perpendicular to an inner surface 11a of the wing panel 11, and a cover 22 provided in the tip end portions of the ribs 21.

Each of the ribs 21 is formed so as to be continuous along the spanwise direction of the main wing 10. In the tip end portion of the rib 21, a flange part 21a extending toward the side opposite to the opposed rib 21 is formed integrally. The rib 21 is formed integrally with the wing panel 11. That is, the wing panel 11 and the ribs 21 are formed by being machined from a metallic base material. The rib 21 can also function as a reinforcing element against the deformation in the out-of-plane direction of the wing panel 11.

The cover 22 is of a strap shape that is long in the spanwise direction of the main wing 10. The cover 22 is provided so as to cover a space between the paired ribs 21 by abutting both of side end parts 22a against the flange parts 21a of the ribs 21.

Both the side end parts 22a of the cover 22 are fastened to the flange parts 21a of the ribs 21 with rivets (fastening members) 23 arranged at predetermined intervals.

Figure 3:
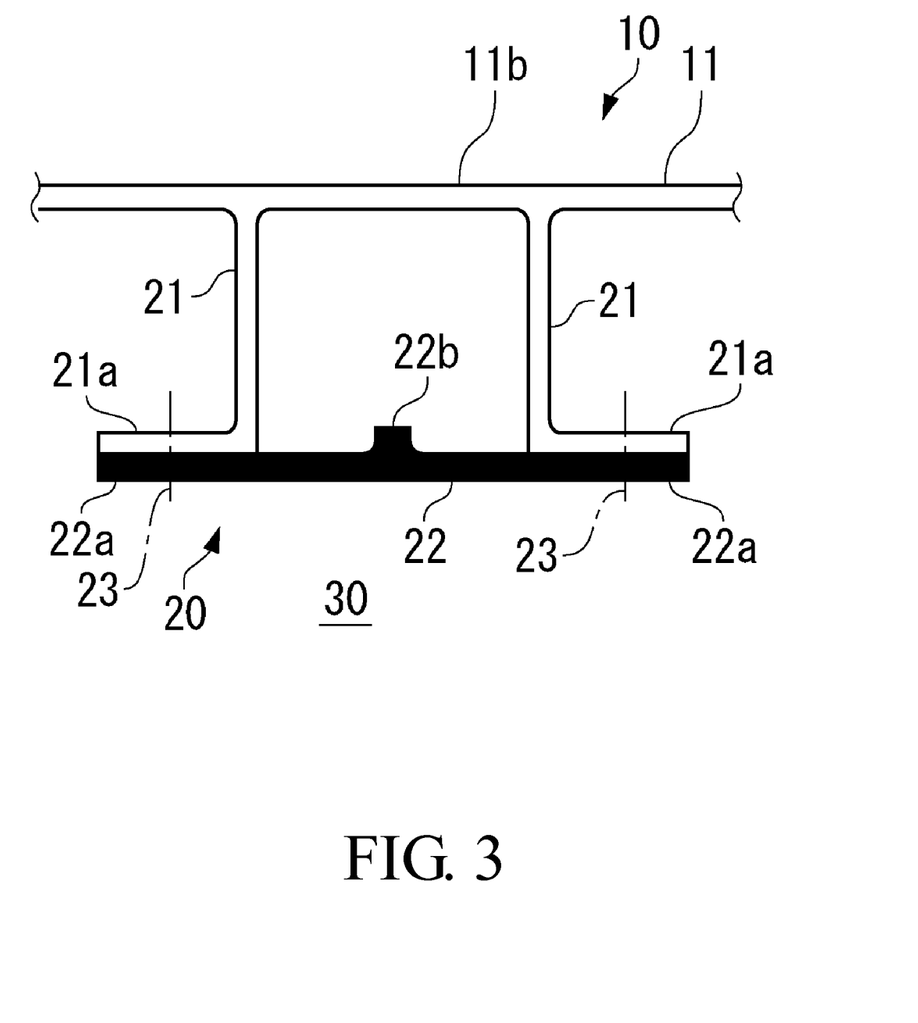
FIG. 3 is a sectional view showing another example of a vent stringer.

The cover 22 may be of a shape of a thin sheet having a thickness of, for example, 2 mm or less as shown in FIG. 2, or can be formed of a thick plate to be connected to the ribs 21 so as to function as a part of a reinforcing element for the wing panel 11 as shown in FIG. 3. In the latter case, it is also effective that a reinforcing stiffener 22b is formed on one surface of the cover 22.

The cover 22 sometimes has a length of about 10 m in the wing length direction. Therefore, from the viewpoint of workability and ease of handling when work is performed to mount the cover 22 to the ribs 21, the cover 22 can be formed by a plurality of cover members that divide the cover 22 in the spanwise direction of the main wing 10.

In this case, the cover members that are adjacent to each other in the spanwise direction of the wing must be joined to each other to sustain a load applied from the wing.

Figure 4:
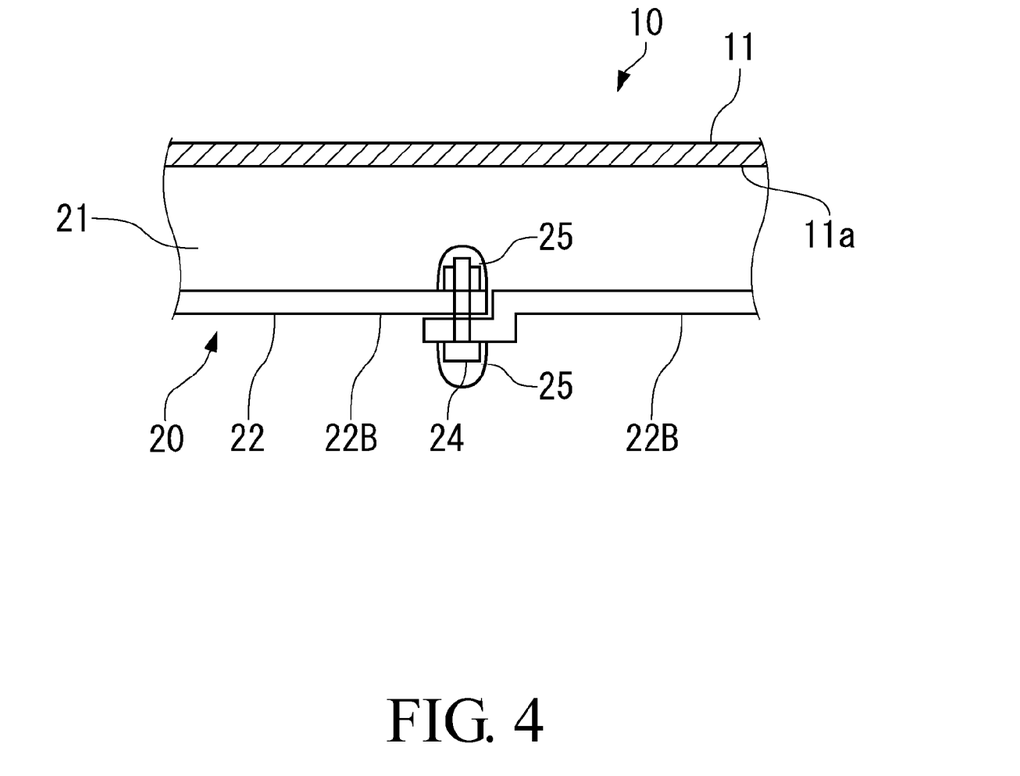
FIG. 4 is a sectional view showing a typical connecting structure of a cover member.

For this purpose, it can be thought that as shown in FIG. 4, the end portions of covers 22B adjacent to each other are overlapped with each other, and are joined to each other by using a joint pin 24 such as a bolt and nut.

However, since the joint pin 24 is located on the inside of the ribs 21, one end portion of the joint pin 24 is located on the internal space side of the vent stringer 20. Since the internal space of the vent stringer 20 connects to a fuel tank, for the joint pin 24 as well, a need for covering the both the end portions thereof with a sealant 25 arises to prevent a spark from occurring at the time of a lightning strike.

A check for determining whether or not the sealant 25 has come off must be made at appropriate timing. However, aside from the time when the aircraft is assembled, after the start of the use of aircraft, it is difficult for a worker to make the check or the like of the internal space of the vent stringer 20.

Figure 5A:
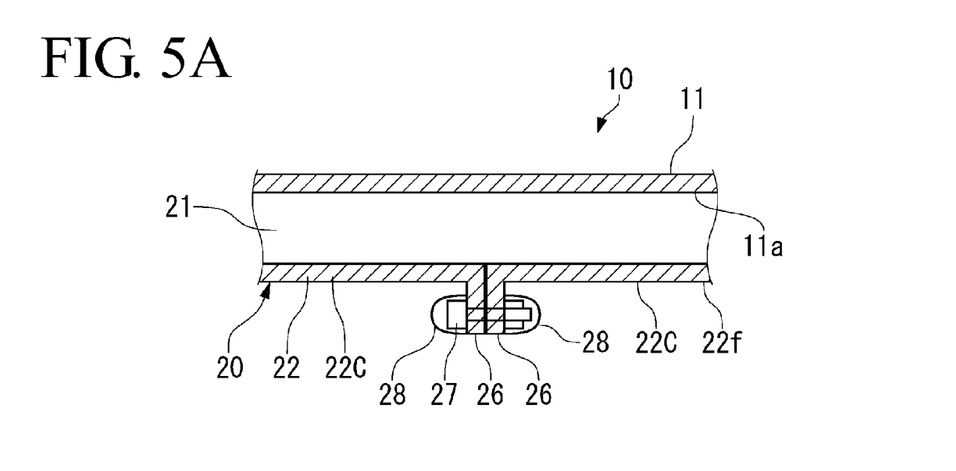
FIG. 5A is a sectional view showing a connecting structure of a cover member in accordance with an embodiment.
Figure 5B:
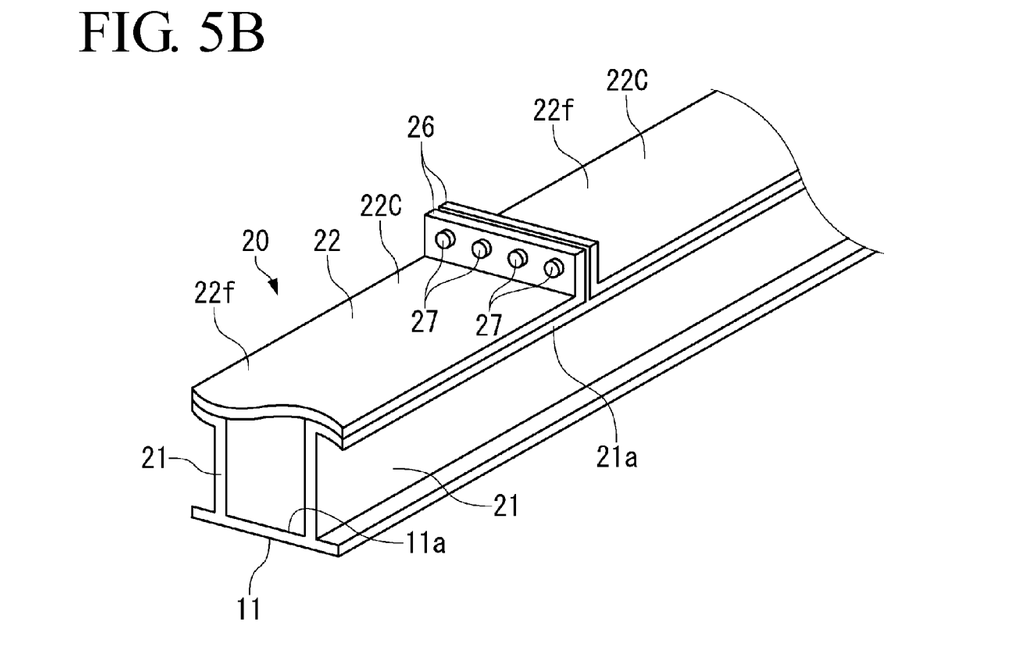
FIG. 5B is a perspective view showing the same.

Accordingly, as shown in FIGS. 5A and 5B, the cover 22 is formed by a plurality of cover members 22C that divide the cover 22 in the spanwise direction of the main wing 10.

Each of the cover members 22C adjacent to each other is formed with a flange 26, which extends to the outside of the vent stringer 20 perpendicularly to a surface 22f of the cover member 22C, in both the end portions of the cover member 22C.

The flanges 26 of the cover members 22C adjacent to each other are joined to each other by using joint pins 27, such as bolts and nuts, each having an axis line in the wing spanwise direction. Further, both opposed end portions of the joint pin 27 are coated with a sealant 28 made of an dielectric material to cover the whole of the opposed end portions of the joint pin 27.

For the vent stringer 20 configured as described above, a space surrounded by the ribs 21, the cover 22, and the inner surface 11a of the wing panel 11 is used as a passage of air introduced from the outside. Air is introduced from the outside into the fuel tank 30 through the vent stringer 20.

In the above-described configuration, since the rivets 23 are not exposed to an outer surface 11b of the wing panel 11, a spark can be prevented from occurring in the fuel tank 30 provided in the main wing 10 through the rivet 23 at the time of a lightning strike.

Also, since the mating surface of the rib 21 and the cover 22 is separate from the outer surface 11b of the wing panel 11 to the inside, a spark is less liable to occur even in the case where the rib 21 and the cover 22 are formed of independent parts.

Thus, lightning protection capability can be improved significantly.

Also, since the work for fastening the cover 22 to the rib 21 using the rivets 23 can be performed on the inner surface 11a side of the wing panel 11, the workability is excellent.

Further, the ribs 21 are formed by being machined integrally with the wing panel 11, so that the ribs 21 are formed with high accuracy so as to match the curved shape of the wing panel 11. On the other hand, the cover 22 has only to be formed by curving a strap member so as to match the shapes of the wing panel 11 and the ribs 21, so that the cover 22 can be caused to abut surely on the tip end portions of the ribs 21. In particular, in the case where the cover 22 is made of a thin sheet, since the cover 22 is easily deformed following the tip end shape of the rib 21 by the fastening using the rivets 23, the workability is especially high.

In addition, the cover 22 is formed by the plurality of the cover members 22C, the flange 26 is formed in the end portions of the cover members 22C adjacent to each other, and the flanges 26 of the cover members 22C adjacent to each other are joined to each other by using the joint pins 27 such as bolts and nuts. If an arc discharge should occur on account of the joint pin 27 at the time of a lightning strike, the sealant 28 made of a dielectric material, which covers the whole of the opposed end portions of the joint pin, prevents the arc discharge from being exposed in the fuel tank. Therefore, a check for determining whether or not the sealant 28 has come off must be made at appropriate timing, however, this check can be easily made from the outside. Also, the work for joining the cover members 22C to each other by using the joint pins 27 can also be easily performed from the outside.

In the above-described embodiment, the configuration is such that the cover 22 is abutted against the flange part 21a of the rib 21. However, any shape and configuration other than those described above can be adopted. For example, the configuration can be made such that the flange part 21a is not formed on the rib 21, and the cover 22 has a substantially U-shaped cross section in which rising portions extending along the side surfaces of the ribs 21 are formed at both ends of the cover 22, and the rising portions are fastened to the side surfaces of the ribs 21.

Figure 6A:
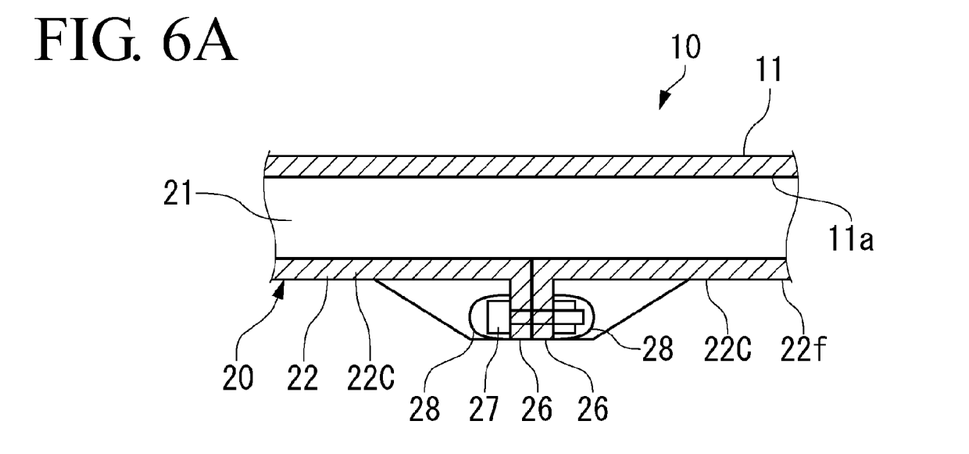
FIG. 6A is a sectional view showing another example of a connecting structure of a cover member in accordance with an embodiment.
Figure 6B:
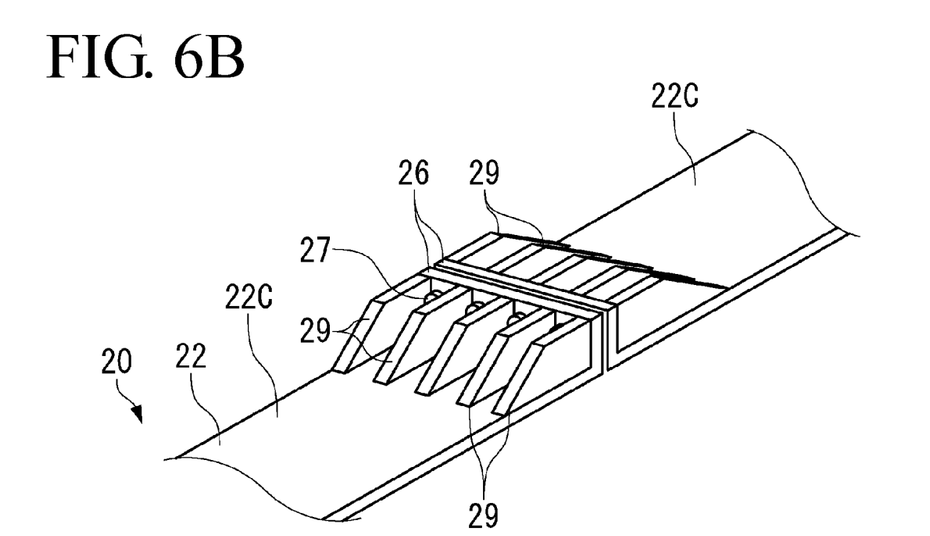
FIG. 6B is a perspective view showing the same.

Also, as shown in FIG. 6B, the configuration can be made such that reinforcing ribs 29 are provided on the flange 26 formed on the cover member 22C.

Besides, the configurations described in the above-described embodiment can be selected, or can be changed to other configurations as appropriate without departing from the spirit and scope of the present invention.

What is claimed is:

1. A vent stringer comprising:
a pair of ribs that are formed integrally on an inner surface of a wing panel forming an outer surface of a wing, the inner surface facing an inside of the wing, and that are continuous in a spanwise direction of the wing; and
a cover provided so as to cover a portion between the tip end portions of the pair of ribs,
wherein a flange part is formed in the tip end portions of each of the pair of ribs and the cover is abutted against the flange part,
wherein the cover is configured to extend over the flange part of one rib of the pair of ribs, the space between the pair of ribs, and the flange part of the other rib of the pair of ribs.

2. The vent stringer according to claim 1, wherein
the cover fastened to the flange part by using a fastening member, wherein the fastening member passes through the cover and the flange part.

3. The vent stringer according to claim 1, wherein the rib is formed by being machined from a metallic base material that constitutes the wing panel.

4. The vent stringer according to claim 1, wherein
the cover is formed by arranging a plurality of cover members in the spanwise direction of the wing and by joining the cover members to each other;
flanges rising toward an outside of the vent stringer are provided in the end portions of the cover members adjacent to each other in the spanwise direction of the wing; and
the flanges of the cover members adjacent to each other are joined to each other by using a joint pin having an axis line in the spanwise direction of the wing.

5. The vent stringer according to claim 2, wherein
the cover is formed by arranging a plurality of cover members in the spanwise direction of the wing and by joining the cover members to each other;
flanges rising toward an outside of the vent stringer are provided in the end portions of the cover members adjacent to each other in the spanwise direction of the wing; and
the flanges of the cover members adjacent to each other are joined to each other by using a joint pin having an axis line in the spanwise direction of the wing.

6. The vent stringer according to claim 3, wherein
the cover is formed by arranging a plurality of cover members in the spanwise direction of the wing and by joining the cover members to each other;
flanges rising toward an outside of the vent stringer are provided in the end portions of the cover members adjacent to each other in the spanwise direction of the wing; and
the flanges of the cover members adjacent to each other are joined to each other by using a joint pin having an axis line in the spanwise direction of the wing.

7. The vent stringer according to claim 1, wherein
a total area of the cover is less than a total area of the wing panel.

8. The vent stringer according to claim 1, wherein
the vent stringer includes an internal space at least partially defined by the wing panel, the pair of ribs, and the cover, and the vent stringer is configured to enable passage of air through the internal space from outside a fuel tank into the fuel tank.

9. The vent stringer according to claim 1, wherein
the vent stringer includes an internal space at least partially defined by the wing panel, the pair of ribs, and the cover, and
wherein the cover is fastened to the flange parts of the ribs by a fastening member such that the fastening member is at least partially located outside of the internal space and within an interior space of a main wing.

10. The vent stringer according to claim 9, wherein
the cover is fastened to the flange parts at a fastening location separated from a neutral axis of the vent stringer, and
the fastening location is on an opposite side of the neutral axis from the wing panel.

11. An aircraft main wing comprising:
a wing panel forming an outer surface of the wing; and
the vent stringer according to claim 1.

12. A vent stringer comprising:
a wing panel, wherein the wing panel comprises an outer surface and an inner surface, the outer surface forming the outer surface of a main wing;
at least one pair of ribs, wherein the ribs are formed integrally on the inner surface of the wing panel and are formed continuously in a spanwise direction of the main wing; and a cover, wherein the cover is configured to attach to the pair of ribs between the tip end portions of the pair of ribs, wherein a flange part is formed in the tip end portions of the ribs and the cover is abutted against the flange part, wherein an interior space is defined by the wing panel on one side, the pair of ribs opposite each other and both adjacent to the wing panel, and the cover opposite the wing panel, wherein the cover is configured to extend over the flange part of one rib of the pair of ribs, the space between the pair of ribs, and the flange part of the other rib of the pair of ribs.

13. An aircraft main wing comprising:

a wing panel forming an outer surface of the wing; and a vent stringer, the vent stringer comprising:

a wing panel, wherein the wing panel comprises an outer surface and an inner surface, the outer surface forming the outer surface of a main wing;

at least one pair of ribs, wherein the ribs are formed integrally on the inner surface of the wing panel and are formed continuously in a spanwise direction of the main wing; and a cover, wherein the cover is configured to attach to the pair of ribs between the tip end portions of the pair of ribs, wherein a flange part is formed in the tip end portions of the ribs and the cover is abutted against the flange part, wherein an interior space is defined by the wing panel on one side, the pair of ribs opposite each other and both adjacent to the wing panel, and the cover opposite the wing panel, wherein the cover is configured to extend over the flange part of one rib of the pair of ribs, the space between the pair of ribs and the flange part of the other rib of the pair of ribs.

* * * * *